(12) United States Patent
El Hachmi

(10) Patent No.: US 10,864,493 B2
(45) Date of Patent: Dec. 15, 2020

(54) CHEMICAL PHOSPHORIC ACID PRODUCTION UNIT PROVIDED WITH A PHOSPHOGYPSUM DISCHARGE SYSTEM

(71) Applicant: OCP SA, Casablanca (MA)

(72) Inventor: Abdelaziz El Hachmi, El Jadida (MA)

(73) Assignee: OCP SA

( * ) Notice: Subject to any disclaimer, the term of this patent is extended or adjusted under 35 U.S.C. 154(b) by 0 days.

(21) Appl. No.: 16/467,397

(22) PCT Filed: Dec. 7, 2017

(86) PCT No.: PCT/MA2017/000027
§ 371 (c)(1),
(2) Date: Jun. 6, 2019

(87) PCT Pub. No.: WO2018/106096
PCT Pub. Date: Jun. 14, 2018

(65) Prior Publication Data
US 2020/0094209 A1    Mar. 26, 2020

(30) Foreign Application Priority Data
Dec. 7, 2016  (FR) ...................... 16 62091

(51) Int. Cl.
*B01J 4/00* (2006.01)
*B65G 65/00* (2006.01)
(Continued)

(52) U.S. Cl.
CPC .............. *B01J 4/007* (2013.01); *B65G 65/00* (2013.01); *C01B 25/18* (2013.01); *C01F 11/46* (2013.01)

(58) Field of Classification Search
CPC ... B01J 4/00; B01J 4/001; B01J 4/007; B65G 65/00; C01B 25/00; C01B 25/16; C01B 25/18; C01F 11/00; C01F 11/46
See application file for complete search history.

(56) References Cited

U.S. PATENT DOCUMENTS

| 938,378 A | 10/1909 | Grothe et al. |
| 1,015,299 A | 1/1912 | Cooper |
| 2004/0089599 A1 | 5/2004 | Kurowski |

FOREIGN PATENT DOCUMENTS

| DE | 202012101573 U1 | 5/2012 |
| FR | 330654 A | 8/1903 |

OTHER PUBLICATIONS

Preliminary Search Report for Application No. FR 1662091 dated Oct. 20, 2017, 2 pages.

(Continued)

*Primary Examiner* — Natasha E Young
(74) *Attorney, Agent, or Firm* — Lerner, David, Littenberg, Krumholz & Mentlik, LLP

(57) ABSTRACT

A chemical phosphoric acid production unit, comprising
  a reactor for the production of phosphoric acid;
  a receiving device for receiving phosphogypsum obtained after filtration of phosphoric acid produced in the reactor; and
  a discharge system for discharging phosphogypsum from the receiving device.

The discharge system comprises a chute of which the inlet is located inside the receiving device and arranged communicate with the receiving device, and a flap moveable around an axis of rotation and configured to open according to a predetermined angle corresponding to a predetermined section for the passage of a fraction of phosphogypsum through the inlet of the chute, and to close in order to prevent the passage of phosphogypsum into the chute.

2 Claims, 3 Drawing Sheets

(51) Int. Cl.
*C01B 25/16* (2006.01)
*C01F 11/46* (2006.01)
*C01B 25/18* (2006.01)

(56) References Cited

OTHER PUBLICATIONS

International Search Report from Application No. PCT/MA2017/000027 dated Sep. 5, 2018, 3 pages.

CHEMICAL PHOSPHORIC ACID PRODUCTION UNIT PROVIDED WITH A PHOSPHOGYPSUM DISCHARGE SYSTEM

CROSS-REFERENCE TO RELATED APPLICATIONS

The present application is a national phase entry under 35 U.S.C § 371 of International Application No. PCT/MA2017/000027, now WO2018106096, filed Dec. 7, 2017, which claims priority from French Application No. 1662091 filed Dec. 7, 2016, all of which are hereby incorporated herein by reference.

FIELD OF THE INVENTION

The present invention relates to a chemical phosphoric acid production unit, which is provided with a system for discharging phosphogypsum obtained mainly during the synthesis of phosphoric acid. At the end of synthesis, the phosphogypsum precipitate is separated from the phosphoric acid by filtration, then discharged from the chemical unit through the discharge system.

PRIOR ART

A phosphoric acid production unit comprises a reactor in which the synthesis of phosphoric acid is carried out. The reaction product derived from this synthesis contains phosphoric acid which is recovered, but also a phosphogypsum precipitate which is extracted from the reaction product by filtration and recovered in a suitable receiving device, generally a hopper.

The filtration of phosphogypsum is a method known and commonly used in the chemical industry. Generally speaking, a rotating horizontal filter with pivoting filter cloths is used. Such filters are described notably in the documents US 2004/0089599 and US 938378. These filters comprise filtration cells arranged so as to form a cylinder, and are rotationally moveable around the axis of the cylinder. Once the filtration has finished, the cylinder is tipped over and the filtrate, here the phosphogypsum precipitate, is displaced towards a receiving device located directly in line with the filter, such as a hopper for example.

Once the phosphogypsum recovered in the hopper, it is generally discharged from said hopper thanks to a carrier fluid, which is usually water. This method has however the drawback of considerably humidifying the phosphogypsum, making it very heavy, and thus more difficult to displace. In addition, the majority of methods for upgrading phosphogypsum require it to be dry. Yet the method of discharging by water jet significantly increases the subsequent drying time, which leads to a loss of time and consequent financial losses.

In order to resolve this problem, it is possible to use, instead of the water jet, a motorised worm screw, positioned at the hopper outlet. Phosphogypsum is lodged in the splines of the worm screw then is discharged by rotation of the latter. The discharge of phosphogypsum is thereby carried out "by dry process", that is to say without the use of a carrier fluid, and in particular without water. This worm screw system also has the advantage of being able to control the phosphogypsum discharge rate, through the adjustment of the rotating speed of the worm screw and its intrinsic characteristics such as the dimensions of its splines.

However, the splines of the worm screw are regularly fouled up and blocked, significantly decreasing the discharge rate. This causes frequent stoppages of the unit, and thus a notable loss of time and supplementary production costs.

Furthermore, the method for discharging phosphogypsum by worm screw does not make it possible to control the fraction, or relative quantity, of phosphogypsum discharged with respect to the initial quantity of filtered phosphogypsum arriving at the inlet of the hopper, since the totality of the phosphogypsum at the outlet of the hopper is discharged by the worm screw.

DESCRIPTION OF THE INVENTION

The aim of the present invention is thus to overcome the drawbacks of the prior art by proposing a chemical phosphoric acid production unit comprising a phosphogypsum discharge system making it possible to control the fraction, also designated relative quantity, of discharged phosphogypsum, with respect to the initial quantity of phosphogypsum obtained after filtration at the inlet of the receiving device.

The system for discharging phosphogypsum from the chemical unit also aims to discharge phosphogypsum "by dry process", that is to say without the use of carrier fluid, such as water for example which is the carrier fluid the most widely used. The phosphogypsum discharged is then easily exploitable, and its physical and chemical properties are not altered.

To this end, the subject matter of the invention is a chemical phosphoric acid production unit, comprising:
  a reactor for the production of phosphoric acid,
  a device for receiving phosphogypsum obtained after filtration of phosphoric acid produced in the reactor,
  a system for discharging phosphogypsum from the receiving device,
  in which the discharge system comprises a chute of which the inlet is located inside the receiving device and is arranged so as to communicate with said receiving device, and a flap moveable around an axis of rotation, said flap being able to open according to a predetermined angle corresponding to a predetermined section for the passage of a fraction of phosphogypsum through the inlet of the chute, and to close in order to prevent the passage of phosphogypsum into the chute.

The phosphogypsum is discharged by dry process from the chemical unit. The fraction of discharged phosphogypsum is controlled notably by adjustment of the opening of the flap, and any potential loss of phosphogypsum during its discharge is minimised thanks to the positioning of the inlet of the chute in the receiving device.

According to other optional characteristics of the chemical phosphoric acid production unit taken alone or according to all technically possible combinations thereof:
  the opening angle of the flap is comprised between 0° when said flap is closed and 90°, preferably 75°, when said flap is open;
  the flap is actuated by at least one pneumatic or electric actuator;
  the discharge system further comprises a duct communicating with the outlet of the chute, enabling the discharge of phosphogypsum from the chute;
  the flap opens towards the inside of the phosphogypsum receiving device. This is particularly advantageous when the section of the chute is greater than that of the duct, and that the flap is designed to operate in the chute and henceforth has a size that allows it to move in the chute but not in the duct;

the axis of rotation of the flap is arranged in the chute at the outlet of the chute communicating with the duct;

the chemical unit further comprises a second phosphogypsum discharge system, the latter enabling the discharge of a second fraction of the quantity of phosphogypsum initially present at the inlet of the receiving device, such that the sum of the two fractions corresponds to said quantity of phosphogypsum initially present at the inlet of the receiving device;

The invention also relates to a method for discharging phosphogypsum from a phosphogypsum receiving device, in a chemical unit such as defined previously, comprising a step of opening the flap accessing the chute according to a predetermined angle, and a step of circulating a fraction of phosphogypsum from the receiving device into the chute.

According to another optional characteristic, the method further comprises a step of transfer of the fraction of phosphogypsum from the chute to a duct, enabling the discharge of phosphogypsum from the chute.

BRIEF DESCRIPTION OF THE FIGURES

Other advantages and characteristics of the invention will become clear from reading the following description given by way of illustration and non-limiting, with reference to the appended Figures, which represent.

DETAILED DESCRIPTION OF THE INVENTION

The following description mainly pertains to a system for discharging phosphogypsum from a receiving device, within a phosphoric acid production unit, as well as to a method for discharging phosphogypsum from such a receiving device.

The system and the method for discharging phosphogypsum are described in parallel in the remainder of the present text in order to simplify the description.

Figure 1:
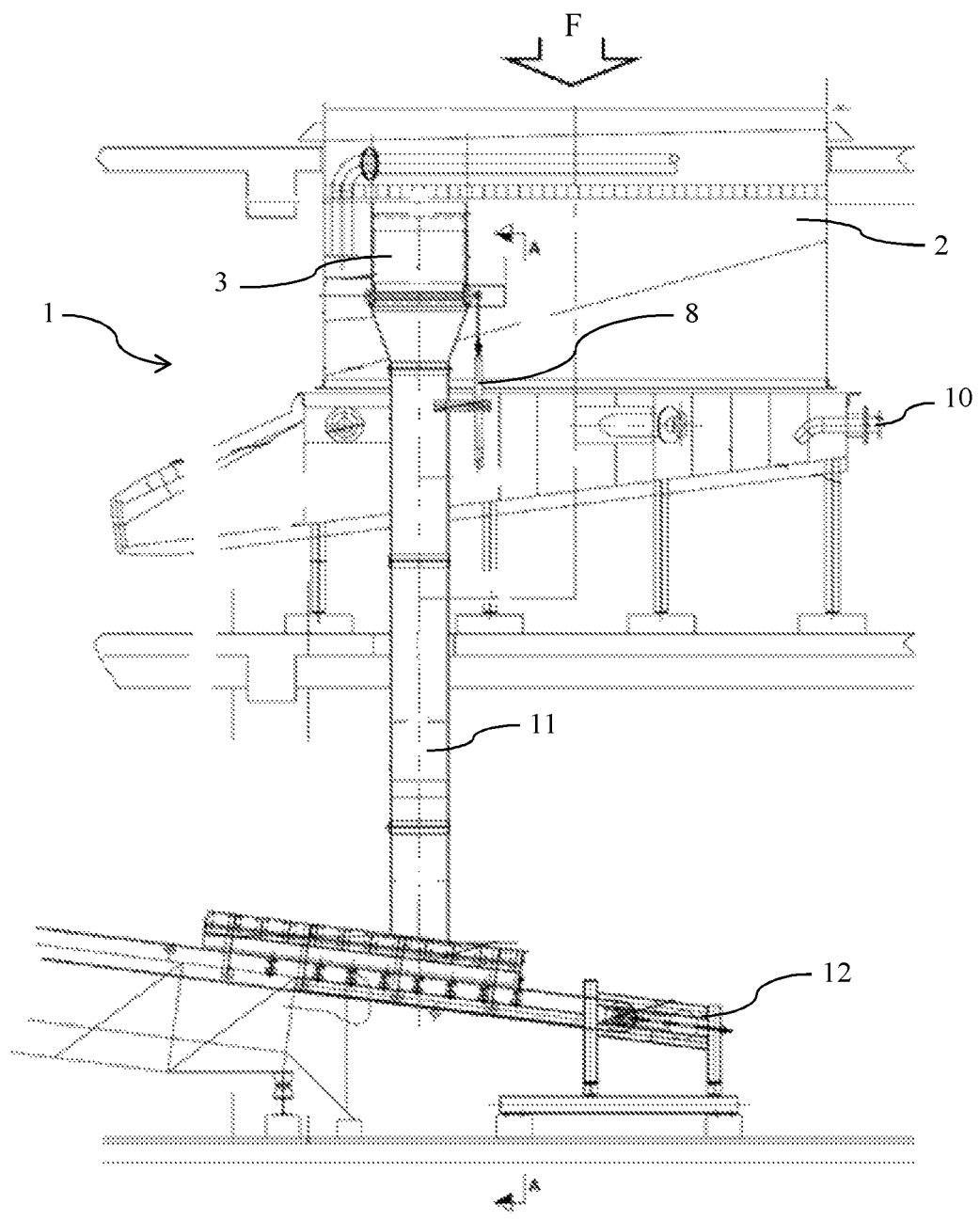
FIG. 1, a general side view of the phosphogypsum discharge system within a chemical phosphoric acid production unit, according to the invention.
Figure 2:
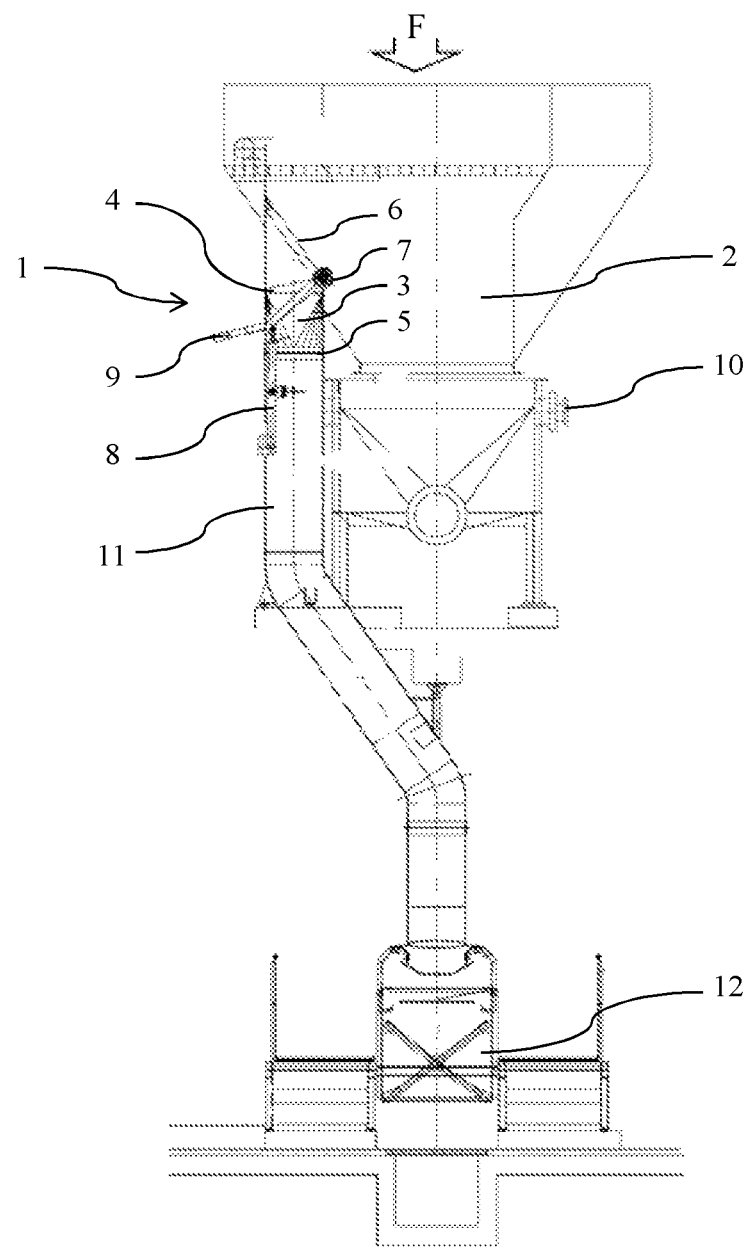
FIG. 2, a sectional view along the axis A-A of the discharge system of FIG. 1.

The phosphogypsum discharge system is quite particularly, but not exclusively, provided to be associated with another discharge system, designated in the remainder of the present text as third-party system, of which only the fluid nozzles are represented in FIGS. 1 and 2.

At the inlet of the chemical unit, the incoming phosphogypsum F is filtered by a suitable filtration device, making it possible to separate phosphogypsum from phosphoric acid, during the synthesis of phosphoric acid.

The phosphogypsum discharge system is located downstream of the filtration device. It is quite particularly, but not exclusively, suited to discharge phosphogypsum filtered beforehand by a rotating horizontal filter with pivoting filter cloths.

When the phosphogypsum has been filtered, it is poured into a receiving device, the latter generally being a hopper such as represented with reference 2 in FIGS. 1 and 2. It is the quantity of phosphogypsum initially present at the inlet of the receiving device, or more simply the initial quantity of phosphogypsum, noted Mi.

A fraction of the initial quantity of phosphogypsum, or relative quantity, is next discharged through the discharge system (partial discharge) whereas the remaining fraction is preferably discharged by a third-party system, generally well known to those skilled in the art.

A fraction of phosphogypsum is defined as being the ratio between a defined quantity of phosphogypsum and the initial quantity Mi of phosphogypsum.

The discharge system henceforth makes it possible to control on the one hand the quantity $M_S$ (by volume or by mass for example) of phosphogypsum discharged by dry process by said system, and the associated fraction $F_S$ corresponding to the quantity $M_S$ of phosphogypsum discharged divided by the initial quantity Mi of phosphogypsum ($F_S=M_S/Mi$).

It makes it possible on the other hand in an indirect manner to control the quantity $M_H$ (by volume or by weight for example) of phosphogypsum discharged by wet process by the third-party system, and the associated fraction $F_H$ corresponding to the quantity $M_H$ of phosphogypsum discharged divided by the initial quantity Mi of phosphogypsum ($F_H=M_H/Mi$) of which the discharge is usually carried out via a carrier fluid.

With reference to FIGS. 1 and 2, the phosphogypsum discharge system 1 comprises a chute 3 of which the inlet 4 communicates with the hopper 2, in order to enable the passage of a fraction $F_S$ of phosphogypsum from the hopper 2 to the chute 3 when necessary.

Advantageously, the chute 3 is in part located inside the hopper, so as to avoid any loss of phosphogypsum outside of the discharge circuit. In particular, the inlet 4 of the chute is advantageously located inside the hopper 2 with this same aim.

The dimensions of the chute 3 as well as its positioning relative to, and if needs be inside, the hopper 2 are adapted at one and the same time in order to maximise the discharge capacity of phosphogypsum through the discharge system 1 from the hopper, and in order to minimise the bulk of the chute part located in the hopper.

In particular, when the phosphogypsum has been filtered by a rotating horizontal filter with pivoting filter cloths, the inlet 4 of the chute 3 makes it possible to collect a part of the phosphogypsum discharged by the cloths of the filter, and the dimensions of the chute 3 as well as its positioning relative to, and if needs be inside, the hopper 2 are adapted in order to maximise the flow of phosphogypsum falling from a pivoting filter cloth and passing orthogonally through the passage section 13 of the chute 3.

The phosphogypsum discharge system 1 further comprises a flap 6 rotationally moveable around an axis 7, the latter being substantially horizontal, that is to say substantially parallel to the ground on which rests the chemical unit comprising the discharge system.

The flap 6 is advantageously positioned near to the inlet 4 of the chute 3. According to the embodiment of FIG. 2, the axis 7 of the flap 6 is arranged at the inlet 4 of the chute, and enables the passage of the phosphogypsum from the hopper 2 into the chute 3.

Figure 3A:
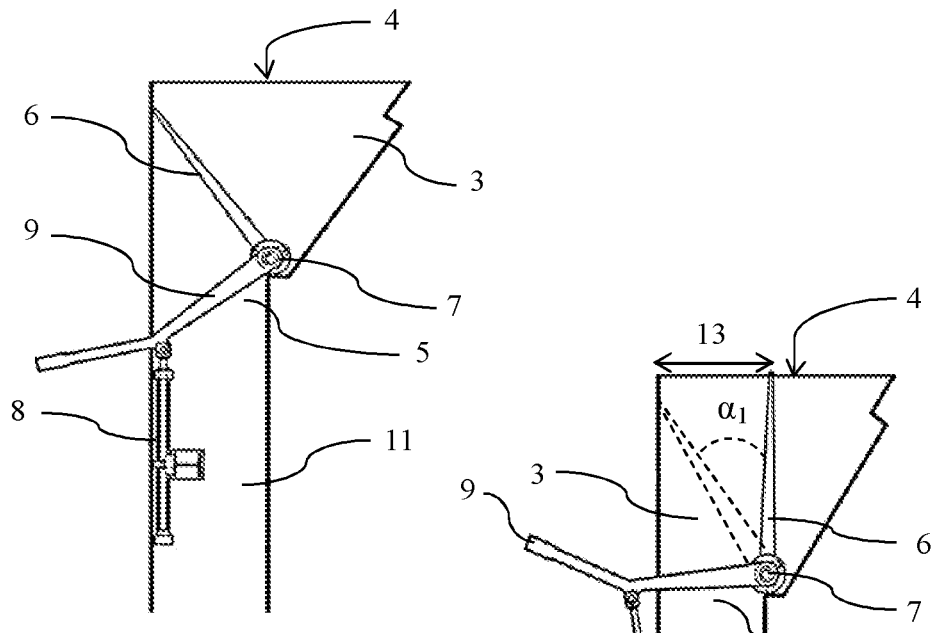
FIG. 3A, a schematic diagram of the phosphogypsum discharge system according to the invention, in which the flap is closed.
Figure 3B:
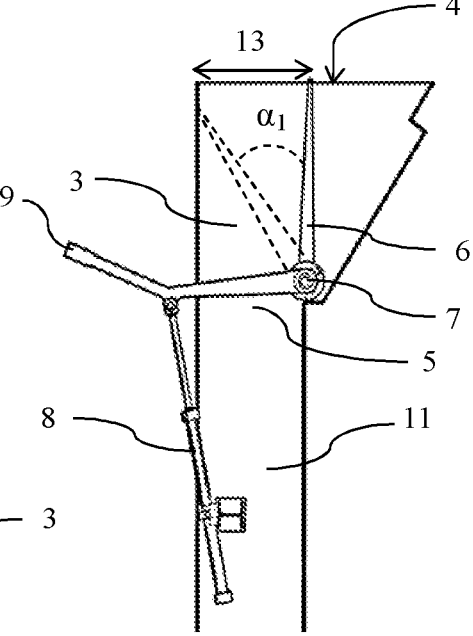
FIG. 3B, a schematic diagram similar to that of FIG. 3A, in which the flap is half open.
Figure 3C:
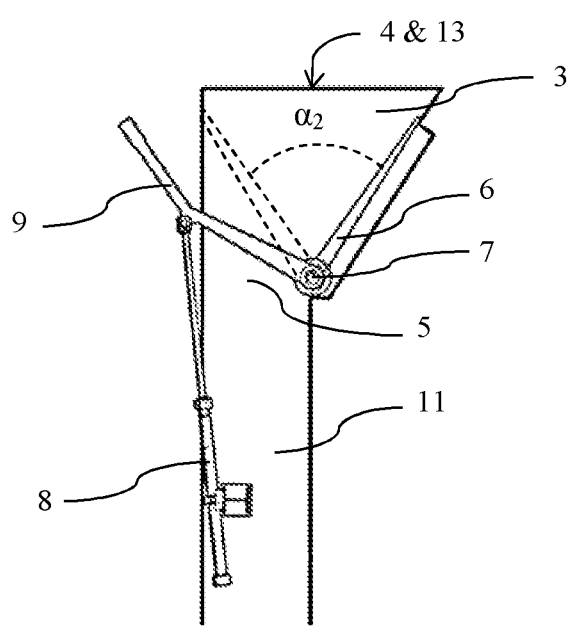
FIG. 3C, a schematic diagram similar to that of FIGS. 3A and 3B, in which the flap is open to its maximum.

According to another embodiment illustrated in FIGS. 3A, 3B, and 3C, the axis 7 of the flap 6 is arranged in the chute at the outlet 5 of the chute, and jointly enables the passage of phosphogypsum from the hopper 2 into the chute 3 and the passage of phosphogypsum from the chute to the duct 11 located in the extension of the chute.

The flap 6 allows or prohibits the passage of phosphogypsum into the chute 3 respectively by opening or closing by rotation around its axis 7. In addition, in a preferred manner, the flap 6 opens towards the inside of the hopper 2 and is located, when it is open, inside the hopper.

Preferably, the flap 6 is of trapezoidal shape.

With reference to FIGS. 3A, 3B, and 3C, the opening angle of the flap 6, noted α, makes it possible to adjust the section for the passage 13 of phosphogypsum into the chute then into the duct 11, and thereby to control the fraction of phosphogypsum discharged through the discharge system 1.

Thus, the greater the opening angle α of the flap 6, the larger the section for the passage 13 of phosphogypsum through the inlet 4 of the chute, and the greater the fraction of phosphogypsum discharged through the discharge system 1. Conversely, the smaller the opening angle α of the flap 6, the smaller the section for the passage 13 of phosphogypsum through the inlet 4 of the chute, and the smaller the fraction of phosphogypsum discharged through the discharge system 1.

By extension, other associated quantities such as for example the flow rate for discharging phosphogypsum (with a continuous operation of the filtration device and the discharge system) through the discharge system, are also known and controlled by varying the opening angle of the flap.

The opening angle α of the flap 6 is preferably comprised between 0° when said flap is closed, and 90°, in a more preferred manner 75°, when the flap is open.

Preferably, the flap 6 is actuated by one or more pneumatic actuator(s) 8, of which the operation is represented in FIGS. 3A, 3B and 3C.

One end of the actuator is fixed to the duct 11 which communicates with the outlet 5 of the chute 3, said duct making it possible to convey dry phosphogypsum to a belt conveyor 12.

The free end of the actuator 8 is hinged to an arm 9, itself hinged, and preferably integral, to the flap 6. When the flap is closed, in FIG. 3A, the actuator 8 is compressed and the arm 9 is lowered. Phosphogypsum cannot then pass through the chute 3. The extension of the actuator 8 causes the rising of the arm 9, which itself causes the opening of the flap 6 by rotation around its axis 7. Phosphogypsum can then pass through the chute 3 and penetrate into the duct 11.

Thus, the flap is partially open according to an angle $α_1$, corresponding to a passage section 13, in FIG. 3B, and totally open according to an angle $α_2$, corresponding to a larger passage section 13, in FIG. 3C.

Alternatively, the flap 6 is actuated by one or more electric motor(s). Obviously, the flap 6 may be actuated by any suitable means provided for this purpose.

Phosphogypsum passes through the chute 3 and next passes from the chute to the duct 11, to be conveyed to the belt conveyor 12. Flexible bibs 13 are advantageously provided in order to ensure sealing between the outlet of the duct 11 and the belt conveyor 12. The latter then ensures the handling of the phosphogypsum to a defined zone.

It is specified that the chute 3, the flap 6, and the duct 11 are designed so as to ensure an optimal speed of conveying the phosphogypsum without carrier fluid. In addition, the constituent materials of these three elements are resistant to the corrosion and abrasion caused by phosphogypsum.

The remaining fraction of phosphogypsum $F_H$, not recovered through the phosphogypsum discharge system 1, is collected in the bottom of the hopper 2 then discharged from said hopper by the third-party system. As indicated previously, it generally involves a water jet generated by nozzles 10 provided for this purpose. The flow rate of the water jet is controlled by valves as a function of the flow rate of phosphogypsum in order to minimise the consumption of water and energy.

At the outlet of the chemical unit, a dry fraction $F_S$ of phosphogypsum has thus been recovered via the phosphogypsum discharge system 1, and a humid fraction $F_H$ of phosphogypsum via the third-party system. These two fractions are controllable and adjustable via the opening angle α of the flap 6, that is to say that it is possible to adapt the relative quantities of phosphogypsum discharged by each discharge system with respect to the initial quantity Mi of filtered phosphogypsum.

The ratio of dry fraction over humid fraction $R=F_S/F_H$ is then known. Control of the ratio R makes it possible to better respond to the industrial needs arising subsequent to the described method.

To conclude, the phosphogypsum discharge system described makes it possible to discharge a flow rate of phosphogypsum independently of the production rate of the filtration device, and without alteration of the physical and chemical properties of the phosphogypsum, notably the humidity level and the phosphoric acid content, and without perturbation of the operating parameters of the filtration device.

REFERENCES

US 2004/0089599
US 938378

The invention claimed is:

1. A method for discharging phosphogypsum from a device for receiving phosphogypsum, in a chemical phosphoric acid production unit comprising:
   a reactor for the production of phosphoric acid,
   a receiving device for receiving phosphogypsum obtained after filtration of phosphoric acid produced in the reactor,
   a discharge system for discharging phosphogypsum from the receiving device,
   the discharge system comprising:
   a chute of which the inlet is located inside the receiving device and is arranged so as to communicate with said receiving device; and
   a flap moveable around an axis of rotation, said flap being able to open according to a predetermined angle corresponding to a predetermined section for the passage of a fraction of phosphogypsum through the inlet of the chute, and to close in order to prevent the passage of phosphogypsum into the chute;
   the method comprising:
   a step of opening the flap accessing the chute according to a predetermined angle; and
   a step of circulating a fraction of phosphogypsum from the receiving device into the chute.

2. The method of claim 1, further comprising a step of transfer of the fraction of phosphogypsum from the chute to a duct, enabling the discharge of phosphogypsum from the chute.

\* \* \* \* \*